(12) United States Patent
Lefurgy et al.

(10) Patent No.: US 11,520,616 B2
(45) Date of Patent: Dec. 6, 2022

(54) VIRTUAL SERVER CREATION MONITORING AND RESOURCE ALLOCATION SYSTEM

(71) Applicant: International Business Machines Corporation, Armonk, NY (US)

(72) Inventors: Charles Lefurgy, Austin, TX (US); Guillermo Jesus Silva, Cedar Park, TX (US); Malcolm S. Allen-Ware, Tuscon, AZ (US); Jeffrey Bloom, Bellingham, MA (US); Christopher Michael Galtenberg, Santa Barbara, CA (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 16/864,921

(22) Filed: May 1, 2020

(65) Prior Publication Data
US 2021/0342175 A1    Nov. 4, 2021

(51) Int. Cl.
| | |
|---|---|
| *G06F 9/455* | (2018.01) |
| *G06F 9/50* | (2006.01) |
| *G06F 11/34* | (2006.01) |
| *G06F 11/30* | (2006.01) |

(52) U.S. Cl.
CPC ............ *G06F 9/45558* (2013.01); *G06F 9/50* (2013.01); *G06F 11/301* (2013.01); *G06F 11/3409* (2013.01); *G06F 11/3466* (2013.01); *G06F 2009/45591* (2013.01); *G06F 2201/835* (2013.01); *G06F 2201/86* (2013.01)

(58) Field of Classification Search
CPC .................. G06F 9/45558; G06F 9/50; G06F 2009/45591; G06F 2201/835; G06F 11/3409; G06F 11/3466; G06F 2201/86; G06F 11/301
See application file for complete search history.

(56) References Cited

U.S. PATENT DOCUMENTS

| | | |
|---|---|---|
| 6,823,382 B2 | 11/2004 | Stone |
| 7,082,463 B1 | 7/2006 | Bradley et al. |
| 7,099,879 B2 | 8/2006 | Tacaille et al. |
| 7,558,739 B2 | 7/2009 | Thomson |
| 8,099,488 B2 | 1/2012 | Laye et al. |
| 8,510,425 B2 | 8/2013 | Bantz et al. |
| 8,745,216 B2 | 6/2014 | Pasala et al. |
| 8,832,246 B2 | 9/2014 | Nair et al. |
| 10,289,973 B2 | 5/2019 | Feller et al. |
| 10,311,356 B2 | 6/2019 | Gu et al. |
| 10,380,189 B2 | 8/2019 | Boe et al. |
| 2002/0143920 A1 | 10/2002 | Dev et al. |

(Continued)

OTHER PUBLICATIONS

Mell et al., "The NIST Definition of Cloud Computing," National Institute of Standards and Technology Special Publication 800-145, Sep. 2011, 7 pages.

*Primary Examiner* — Michael W Ayers
(74) *Attorney, Agent, or Firm* — Yee & Associates, P.C.

(57) ABSTRACT

Virtual servers are monitored in real-time. A group of virtual servers from virtual server events occurring within a time window is identified by a computer system in real-time. A metric is determined for the group of virtual servers by the computer system in real-time using the virtual server events occurring within the time window for the group of virtual servers. A set of actions is performed by the computer system using the metric.

18 Claims, 8 Drawing Sheets

(56) References Cited

U.S. PATENT DOCUMENTS

| | | | |
|---|---|---|---|
| 2014/0059542 A1* | 2/2014 | Ashok | G06F 9/5077 |
| | | | 718/1 |
| 2017/0109187 A1* | 4/2017 | Cropper | G06F 1/3234 |
| 2018/0060132 A1* | 3/2018 | Maru | H04L 67/1031 |
| 2018/0145883 A1* | 5/2018 | Kaneko | G06F 9/4881 |
| 2018/0276019 A1* | 9/2018 | Ali | G06F 11/1469 |
| 2019/0163550 A1 | 5/2019 | Harutyunyan et al. | |
| 2019/0213027 A1* | 7/2019 | Bhandari | G06F 9/505 |

* cited by examiner

VIRTUAL SERVER CREATION MONITORING AND RESOURCE ALLOCATION SYSTEM

BACKGROUND

1. Field

The disclosure relates generally to an improved computer system and, more specifically, to a method, apparatus, system, and computer program product for monitoring virtual servers in a computer system in real-time.

2. Description of the Related Art

Data centers are centralized locations where computing and networking equipment are located for purposes of providing resources to access large amounts of data. The data centers can be used to provide services such as data storage, backup and recovery, data management, and networking. These data centers can provide processing resources in the form of servers to customers. The data centers can provide these servers in the form of virtual servers. The data centers can be virtualized in a cloud environment.

Virtual servers can be started by users such as customers and data center operations staff. The virtual servers can have service level objectives (SLOs). For example, the service level objectives can be present for the creation of the virtual servers.

SUMMARY

According to one embodiment of the present invention, a method monitors virtual servers in real-time. A group of virtual servers from virtual server events occurring within a time window is identified by a computer system in real-time. A metric is determined for the group of virtual servers by the computer system in real-time using the virtual server events occurring within the time window for the group of virtual servers. A set of actions is performed by the computer system using the metric.

According to another embodiment of the present invention, a virtual server management system comprises a computer system that identifies a group of virtual servers from virtual server events occurring within a time window in real-time. The computer system determines a metric for the group of virtual servers in real-time using the virtual server events occurring within the time window for the group of virtual servers. The computer system performs a set of actions using the metric.

According to yet another embodiment of the present invention, a computer program product for real-time monitoring of virtual servers comprises a computer-readable-storage media with first program code, second program code, and third program code stored on the computer-readable storage media. The first program code is executable by a computer system to cause the computer system to identify a group of virtual servers from virtual server events occurring within a time window in real-time. The second program code is executable by the computer system to cause the computer system to determines a metric for the group of virtual servers in real-time using the virtual server events occurring within the time window for the group of virtual servers. The third program code is executable by the computer system to cause the computer system to perform a set of actions using the metric.

DETAILED DESCRIPTION

Figure 1:
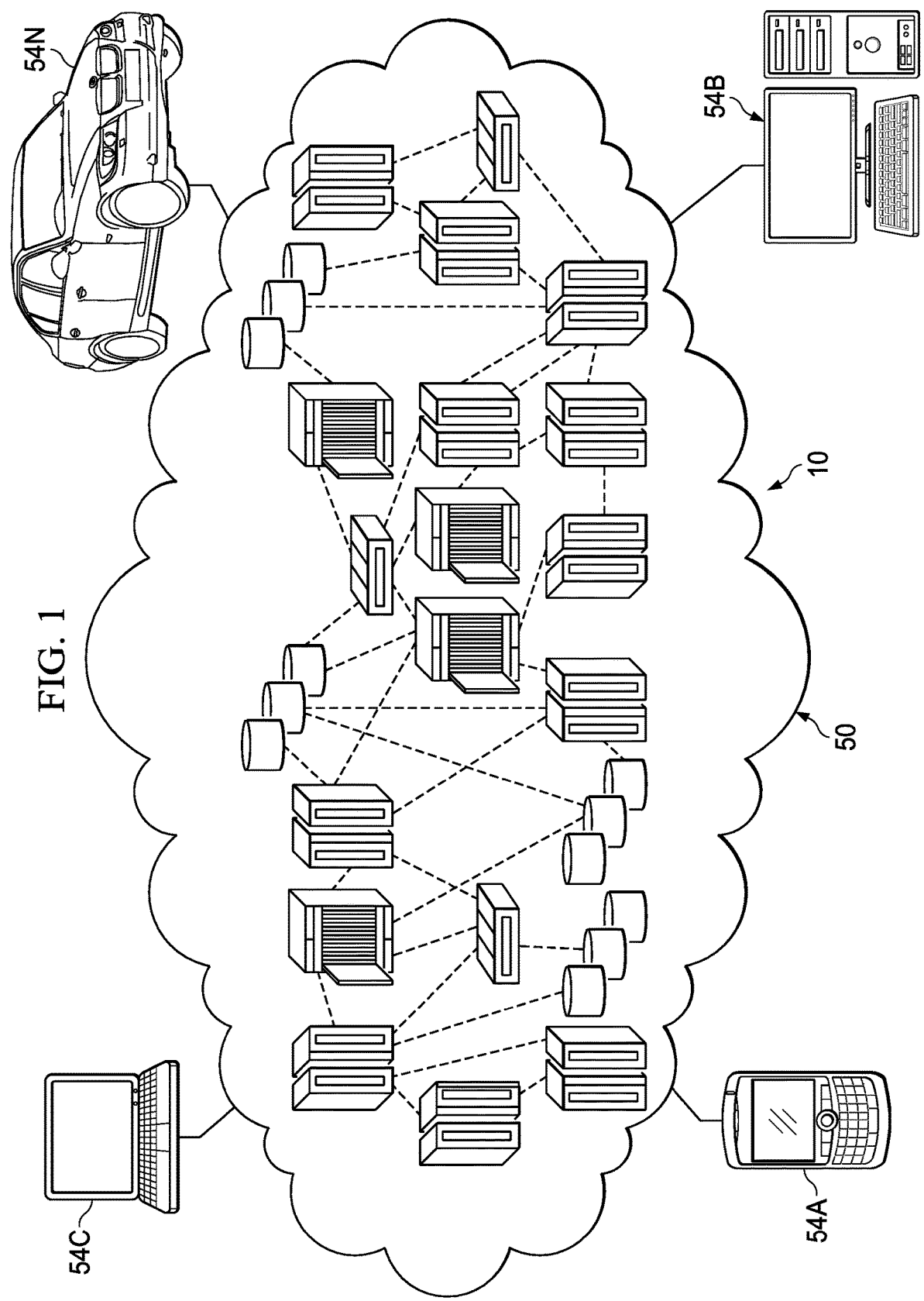
FIG. 1 depicts a cloud computing environment in accordance with an illustrative embodiment of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an illustration of a cloud computing environment is depicted in accordance with an illustrative embodiment. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2:
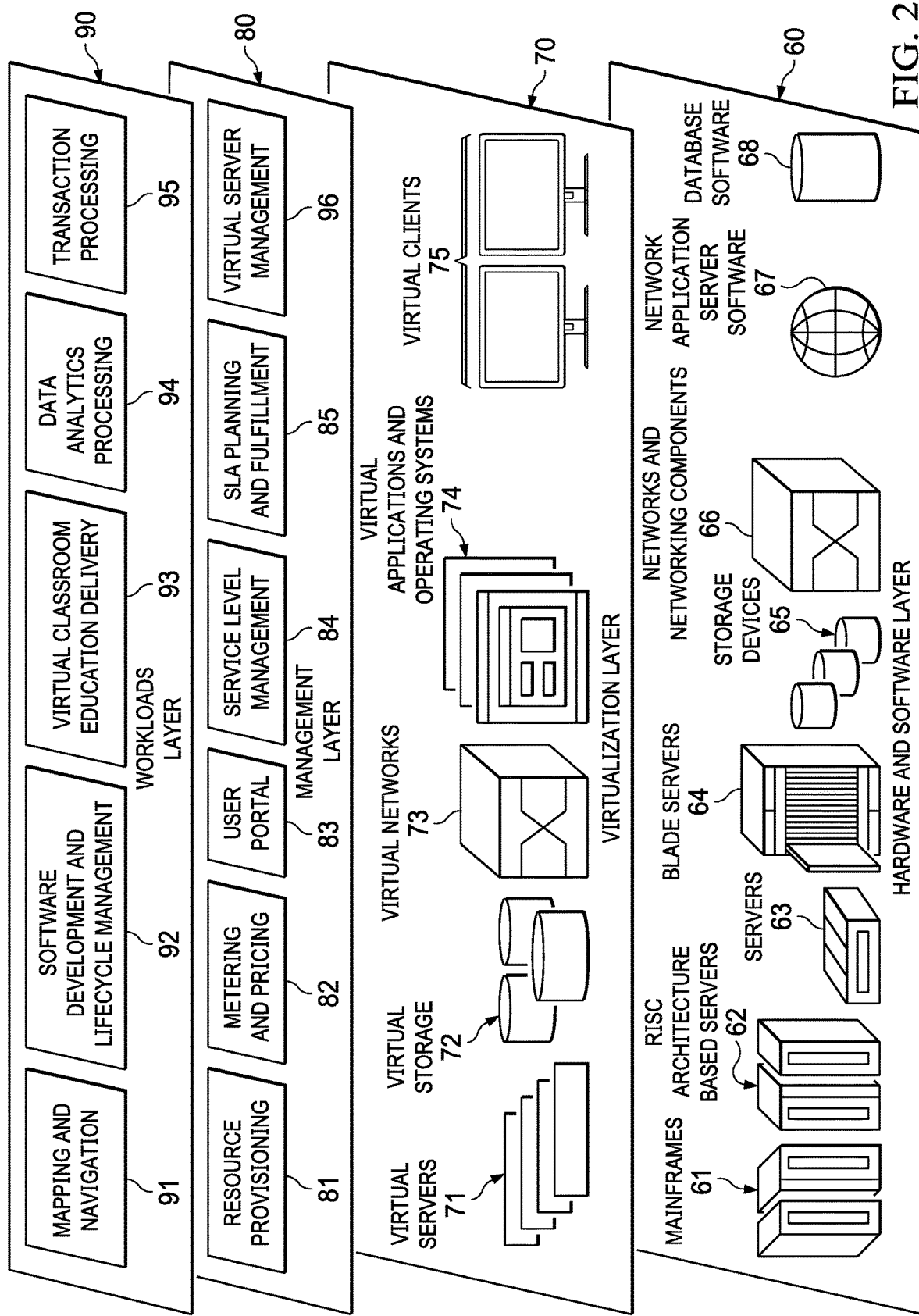
FIG. 2 depicts a set of functional abstraction layers provided by a cloud computing environment in accordance with an illustrative embodiment.

Referring now to FIG. 2, a set of functional abstraction layers provided by a cloud computing environment is depicted in accordance with an illustrative embodiment. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. Virtual server management 96 provides a service for applying creating and monitoring virtual servers, such as virtual servers 71 in virtualization layer 70 in cloud computing environment 50 cloud computing environment 50 in FIG. 1.

In this illustrative example, virtual server management 96 located in management layer 80 can provide services such as a starting a number of virtual servers and monitoring the activity of a number of virtual servers. For example, virtual server management 96 can monitor the creation of a number of virtual servers in real-time and provide metrics on the creation of virtual servers in real-time. These metrics can be used to determine whether service level objectives (SLOs) are being met for at least one of a customer, a data center, of some other entity.

As used herein, "a number of," when used with reference to items, means one or more items. For example, "a number of virtual servers" is one or more virtual servers.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The illustrative embodiments recognize and take into account a number of different considerations. For example, the illustrative embodiments recognize and take into account that determining metrics for service level objectives (SLOs) such as a creation of virtual servers can be more difficult than desired. For example, the illustrative embodiments recognize and take into account that the service level objectives for the virtual servers can be for example, a single virtual server creation in less than three minutes; 100 virtual server creations in less than five minutes; and 1,000 virtual server creations in less than 10 minutes.

The illustrative embodiments recognize and take into account that, currently, one-time tests are employed using an injected load. With the injected load, simultaneous virtual servers are actually created and the creation time is measured to determine whether virtual server creations meet one or more service level objectives. The illustrative embodiments recognize and take into account that these types of tests are one-time tests and do not measure the actual experience of users who request creation servers. Thus, the illustrative embodiments recognize and take into account that it would be desirable to generate metrics for a service level objective or other standard in real-time under actual load conditions.

The illustrative embodiments provide a method, apparatus, system, and computer program product for monitoring virtual servers. In one illustrative example, a group of virtual servers is identified from virtual server events occurring within a time window in real-time. A metric is determined for the group of virtual servers in real-time using the virtual server events occurring within the time window for the group of virtual servers. A set of actions can be performed using the metric.

In the illustrative examples, real-time is the actual time during which a process or event occurs. As depicted, the use of the term "real-time," with respect to actions, means that the actions are performed as without intentional delay.

The set of actions can include publishing the metric, creating an entry in a log for a customer, creating and entering a log for a data center, sending an alert to a data center administrator, allocating resources to enable moving the metric towards the desired level of performance, reconfiguring the resources used to create virtual servers, or other suitable actions.

Figure 3:
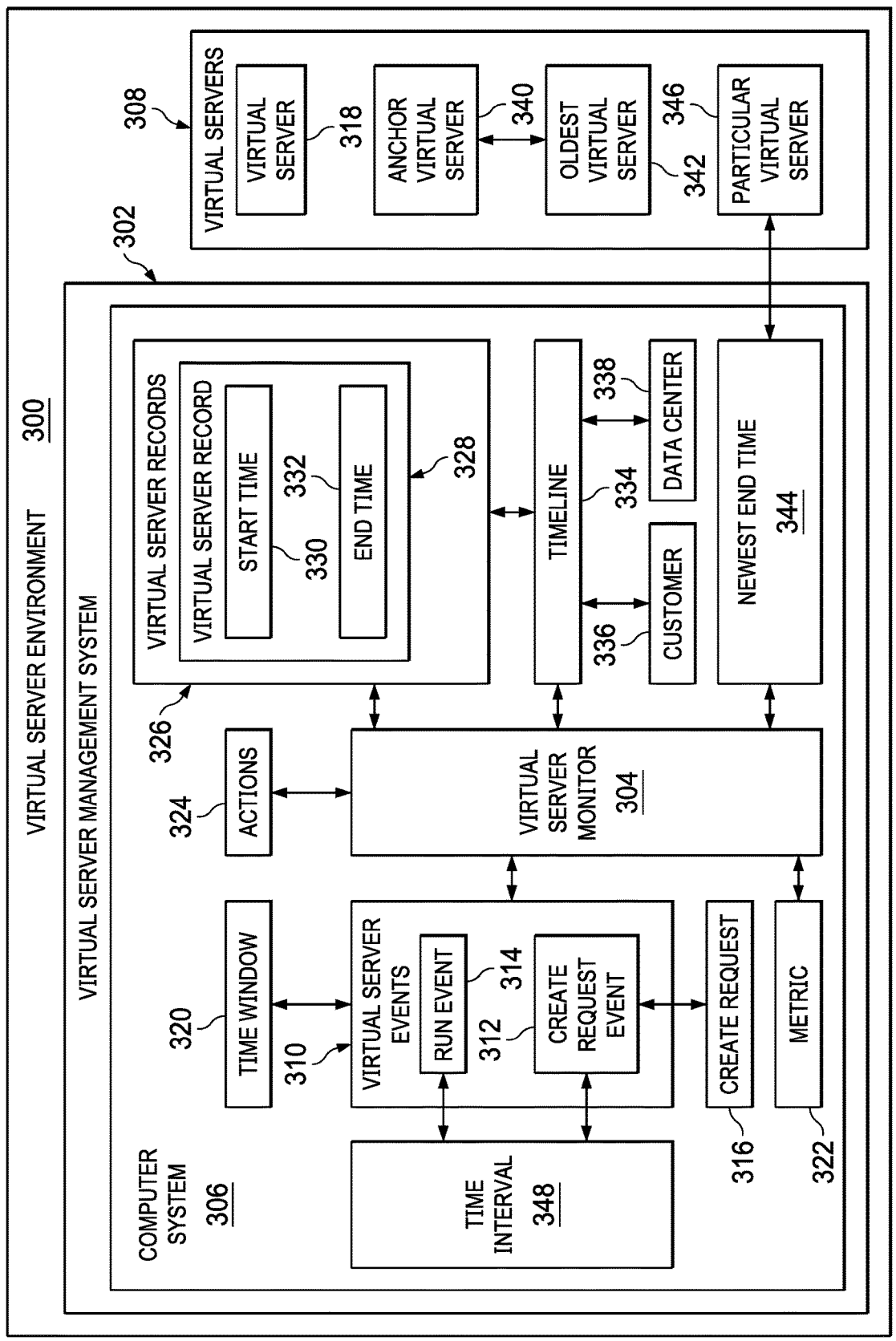
FIG. 3 is a block diagram of a virtual server environment in accordance with an illustrative embodiment.

With reference now to FIG. 3, a block diagram of a virtual server environment is depicted in accordance with an illustrative embodiment. One or more of the components illustrated in virtual server environment 300 can be implemented as part of virtual server management 96 in management layer 80 in FIG. 2.

As depicted, virtual server management system 302 comprises virtual server monitor 304 in computer system 306. Virtual server monitor 304 in computer system 306 operates to monitor virtual servers 308. In this illustrative example, a virtual server is an occurrence of a virtual form of a server computer or an executing process for a virtual form of the server computer that is instantiated from software. In this example, a virtual server is in a form of a virtual machine.

Virtual server monitor 304 can be implemented in software, hardware, firmware, or a combination thereof. When software is used, the operations performed by virtual server monitor 304 can be implemented in program code configured to run on hardware, such as a processor unit. When firmware is used, the operations performed by virtual server monitor 304 can be implemented in program code and data and stored in persistent memory to run on a processor unit. When hardware is employed, the hardware may include circuits that operate to perform the operations in virtual server monitor 304.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 306 is a physical hardware system and includes one or more data processing systems. When more than one data processing system is present in computer system 306, those data processing systems are in communication with each other using a communications medium. The communications medium can be a network. The data processing systems can be selected from at least one of a computer, a server computer, a tablet computer, or some other suitable data processing system.

In this illustrative example, virtual server monitor 304 is located in computer system 306 and can monitor activities relating to virtual servers 308 running in computer system 306. As depicted, virtual server monitor 304 can monitor virtual server events 310 related to virtual servers 308. In this illustrative example, the events include at least one of create request event 312, run event 314, or other events relating to virtual servers 308.

In the illustrative example, events can be generated in management layer 80 in FIG. 1. For example, management layer 80 can include an event service to coordinate software activity across components of the management layer and also across layers. The event service can be implemented using Apache Kafka, IBM Event Streams, or other suitable publish/subscribe services that allow software components to send real-time messages to each other by publishing and subscribing to channels of messages typically organized by topic. For example, there could be an event channel for posting and receiving messages related to virtual server events.

In one illustrative example, resource provisioning 81 in FIG. 2 publishes create request event 312 to the event service when it begins to provision a virtual server on physical hardware such as server computer in blade servers 64 in hardware and software layer 60 in FIG. 2. After the virtual server is provisioned, resource provisioning 81 will signal the hypervisor (or host operating system, or agent running on the host) on the server computer where the virtual server is provisioned to start running the virtual server. As part of the process to start running the virtual server, the hypervisor (or host OS, or agent running on the host) publishes a run event, such as run event 314, to the event service. In one example, resource provisioning 81 in FIG. 2 communicates with a software agent running on the physical host which runs commands for Linux KVM on the host operating system to start the virtual server and publish the run event.

In the illustrative example, virtual server monitor 304 subscribes to virtual server events 310 including create request event 312 and run event 314 from the event service and will receive these event types in real-time or near real-time as the events are produced by resource provisioning 81 and the server computer in blade servers 64 in FIG. 2.

In this illustrative example, virtual server events 310 will have attributes such as a customer identifier, a virtual server identifier, and a timestamp that tells the time when the event was produced. This timestamp is the timestamp used by virtual server monitor 304 in determining metric 322.

In some illustrative examples, a user can define the virtual server (number of CPUs, memory size, etc.) but does not request that the virtual server run immediately. In this case, the virtual server remains in a stopped state and no physical resources are used. These types of events are filtered out and not used in the illustrative example.

As depicted, create request event 312 is an event that occurs when create request 316 is received to create virtual server 318 from a user. The user can be a person operating a computer or other computing device or software process. In this example, create request 316 is sent from the user to resource provisioning 81 in FIG. 2, which generates create request event 312. In this example, virtual server monitor 304 receives create request event 312 but is not responsible for receiving create requests from users.

Create request 316 can also include a timestamp. In this depicted example, this timestamp indicates when create request 316 was generated by the user or when create request 316 was received by a layer or a software component in computer system 306.

In this illustrative example, run event 314 occurs when virtual server 318 begins running. For example, virtual server 318 can begin to run when virtual server 318 is booting up.

As depicted, virtual server monitor 304 operates to identify a group of virtual servers 308 from virtual server events 310 occurring within time window 320 in real-time. In this example, virtual server monitor 304 determines metric 322 for a group of virtual servers 308 in real-time using virtual server events 310 occurring within time window 320 for a group of virtual servers 308.

As used herein, "a group of," when used with reference to items, means one or more items. For example, "a group of virtual servers 308" is one or more of virtual servers 308.

In this illustrative example, virtual server monitor 304 performs a set of actions 324 using metric 322. The set of actions 324 can be selected from at least one of publishing metric 322 in a database, creating an entry in a log for a customer, creating an entry in the log for a data center, sending an alert to a data center administrator, allocating resources to enable moving metric 322 towards a desired level or value, or other suitable actions. As another example, an action can include predicting times to deploy or schedule work or some other processing in computer system 306. Further, allocating the resources can include moving virtual servers that have not yet been started but have long creation times to computers with lower loadings as compared to currently used computer computers for which metric 322 is determined. As another example, the allocation of the resources can include selecting a different data center for a particular customer based on metric 322.

As depicted, metric 322 can be determined again in response to an event. For example, virtual server monitor 304 can repeat the step of identifying the group of virtual servers 308 from virtual server events 310 occurring within time window 320 in real-time and the step of determining metric 322 for the group of virtual servers 308 in real-time using virtual server events 310 occurring within time window 320 for the group of virtual servers 308. As time changes, virtual servers 318 in the group of virtual servers 308 can change.

In this example, the event can be a periodic event or a non-periodic event. A periodic event can be, for example, 10 seconds, 80 seconds, three minutes, five minutes, 15 minutes, or some other time period. A non-periodic event can be, for example, a request to determine metric 322, receiving 100 requests to start a virtual server, detecting a presence of 1,000 virtual servers running in computer system 306, a removal of a physical computer from resources used to run virtual servers 308, or some other non-periodic event.

In repeating the determination of metric 322, virtual server monitor 304 can prune virtual server 318 from the group of virtual servers 308 when virtual server 318 is not needed for a future determination of metric 322. As depicted, the virtual server that is pruned from the group of virtual servers 308 is anchor virtual server 340. As a result, a new anchor virtual server is identified for the group of virtual servers 308.

In the illustrative example, metric 322 can be determined by virtual server monitor 304 analyzing virtual server records 326. As depicted, virtual server monitor 304 creates virtual server record 328 in virtual server records 326 with start time 330 for virtual server 318 when create request 316 for virtual server 318 is detected in real-time. Virtual server monitor 304 updates virtual server record 328 with end time 332 when running of virtual server 318 is detected in real-time. In this example, virtual server record 328 and virtual server records 326 are for timeline 334 associated with at least one of customer 336 or data center 338. For example, start time 330 record is based on the timestamp of received create request event 312, and end time 332 is based on the timestamp of received run event 314. When create request event 312 and run event 314 both correspond to the same virtual server, those events are associated with virtual server record 328 for that virtual server.

In one example, virtual server monitor 304 determines metric 322 by identifying start time 330 for anchor virtual server 340 that is oldest virtual server 342 for the group of virtual servers 308. In this example, oldest means its associated create request event timestamp is the earliest time across all virtual servers in the group. Further, in this illustrative example, virtual server monitor 304 identifies end time 332 as newest end time 344 for particular virtual server 346 that started running in the group of virtual servers 308. As depicted in this example, virtual server monitor 304 calculates metric 322 as time interval 348 from start time 330 to end time 332 for the group of virtual servers 308 using virtual server records 326 for the group of virtual servers 308. When the group of virtual servers 308 is a single virtual server such as virtual server 318, virtual server 318 is both anchor virtual server 340 and particular virtual server 346 with respect to start time 330 and end time 332 used to calculate metric 322.

In one illustrative example, one or more technical solutions are present that overcome an issue with determining whether metrics, with respect to servers, meet standards in real-time. As a result, one or more solutions may provide an effect in which metrics measuring server creation in real-time can be performed from the perspective of actual users.

Further, the illustrative examples enable determining metrics for server creation using virtual server events detected in real-time. In the illustrative examples, these virtual server events include create request events and run events for virtual servers. The illustrative examples place these events and timelines on at least one of a per customer or a per data center basis. Further, the illustrative examples determine clusters of virtual servers based on a selected number of servers desired for the metric and a sliding or moving time window. The illustrative examples enable determining a metric on a regular or periodic basis in real-time such as every 10 seconds, every 30 seconds, every two minutes, or some other period of time. Additionally, the metric can also be determined based on an event such as the creation of some number of virtual servers, when a user requests a current metric for server creation, or some other suitable non-periodic event. Further, the illustrative examples enable removing events with respect to servers when those events are no longer relevant for determining the metric.

Computer system 306 can be configured to perform at least one of the steps, operations, or actions described in the different illustrative examples using software, hardware, firmware, or a combination thereof. As a result, computer system 306 operates as a special purpose computer system in which virtual server monitor 304 in computer system 306 enables monitoring virtual servers in real-time in which the monitoring can include generating metrics with respect to the virtual servers. In particular, virtual server monitor 304 transforms computer system 306 into a special purpose computer system as compared to currently available general computer systems that do not have virtual server monitor 304.

In the illustrative example, the use of virtual server monitor 304 in computer system 306 integrates processes into a practical application for monitoring virtual servers 308 that increases the performance of computer system 306. In other words, virtual server monitor 304 in computer system 306 is directed to a practical application of processes integrated into virtual server monitor 304 in computer system 306 using virtual server events 310 to calculate metrics for virtual servers 308 in real-time. In this illustrative example, virtual server monitor 304 in computer system 306 identifies a group of virtual servers 308 from virtual server events 310 occurring within time window 320 in real-time and determines metric 322 for the group of virtual servers 308 in real-time using virtual server events 310 occurring within time window 320 for the group of virtual servers 308. In this example, metric 322 can be a measure of time for virtual server creation. Virtual server monitor 304 can perform a set of actions 324 using metric 322. These actions can include actions taken to increase the performance of computer system 306 in creating virtual servers 308 to meet a desired level of performance.

In this manner, virtual server monitor 304 in computer system 306 provides a practical application of steps to monitor virtual servers such that the functioning of computer system 306 is improved. For example, increased accuracy in determining metrics for virtual server creation can occur in computer system 306, thus enabling a more accurate determination as to whether computer system 306 is operating within service level objectives or a desired level of performance. These actions can adjust computer system 306 such that virtual server creation reaches desired performance levels more quickly with the availability of real-time metrics being generated with respect to the creation of virtual servers as compared to the manner in which current metrics are generated.

The illustration of virtual server environment 300 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, actions 324 performed by virtual server monitor 304 can be initiated or performed by other components in addition to or separate from virtual server monitor 304. In another illustrative example, virtual servers 308 can be located in another computer system that is separate from computer system 306.

Figure 4:
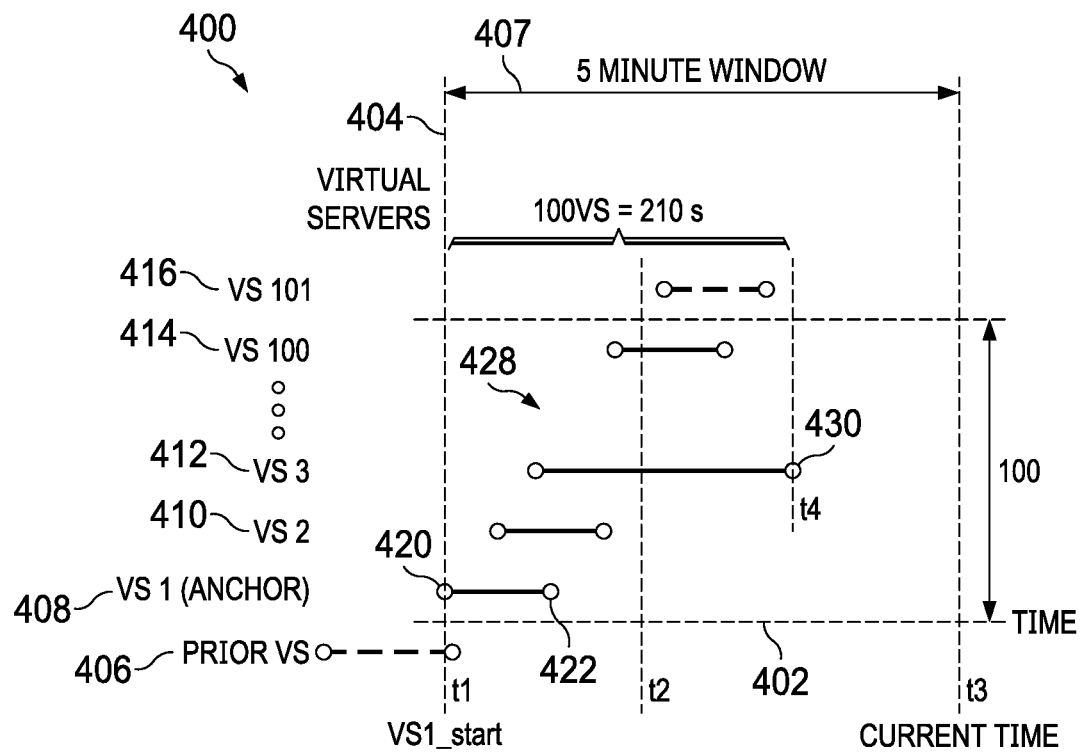
FIG. 4 is an illustration of a timeline of virtual server start and end times in accordance with an illustrative embodiment.

With reference now to FIG. 4, an illustration of a timeline of virtual server start and end times is depicted in accordance with an illustrative embodiment. In this illustrative example, timeline 400 is an example of an implementation for timeline 334 shown in block form in FIG. 3.

As depicted, timeline 400 has x-axis 402 which represents time and y-axis 404 which represents virtual servers. Timeline 400 displays segments for virtual servers. In this illustrative example, the segments depicted include prior VS segment 406 for a prior virtual server, VS1 segment 408 for virtual server VS1; VS2 segment 410 for virtual server VS2; VS3 segment 412 for virtual server VS3; VS100 segment 414 for virtual server VS100; and VS101 segment 416 for virtual server VS101. In this illustrative example, 100 virtual servers are present from virtual server VS1 to virtual server VS100 in timeline 400. The segments for virtual servers VS4 through VS99 are present but not shown in this figure to avoid obscuring a description of the illustrative example.

As depicted, each of the segments has a start time and an end time. For example, VS1 segment has start time 420 and end time 422. In this illustrative example, start time 420 represents the time when a create request was received for virtual server VS1. The time received is indicated by a timestamp for the create request. The time received can be, for example, when resource provisioning 81 in FIG. 2 received the create request. End time 422 represents the time when virtual server VS1 began running.

In this illustrative example, virtual server VS1 is an anchor server and the group of virtual servers comprises 100 virtual servers, virtual servers VS1-VS100.

Time t1 to time t2 represent a two-minute time window from which a metric calculation is made. In this illustrative example, time t1 is the start time of a first virtual server of interest. For example, virtual server VS1 can be a candidate to be considered as the first virtual server (or "anchor virtual server") in a group of virtual servers.

In this illustrative example, bounding box 428 represents the area in timeline 400 containing start times for calculating metrics for the 100 virtual servers. The portion of y-axis 404 from the segment for virtual server VS1 to the segment for virtual server VS100 with the time from time t1 to time t2 forms bounding box 428. As depicted, bounding box 428 determines how the metric calculation can be performed. In this illustrative example, bounding box 428 contains up to a maximum number of virtual servers desired for the metric.

In this depicted example, a number of virtual servers in the group of virtual servers is 100, which is the maximum number of servers desired. Depending on how quickly requests to create servers are received, bounding box 428 may not contain 100 virtual servers. In other illustrative examples, bounding box 428 can contain 50 or 90 servers.

In this example, a two-minute time window from time t1 to time t2 is used to select the group of virtual servers up to 100 virtual servers that are present in bounding box 428. In other words, the group of servers are any servers that have start times within the time window defined by time t1 to time t2. In other examples, the time window can have a different value such as three minutes or some other time period.

In this example, all 100 of virtual servers, virtual servers VS1-VS100, have start times in a two-minute time window from time t1 to time t2. Further, as depicted, all of the virtual servers have started running within five-minute time window 407 from time t1 to time t3. Time t3 is the current time in this example. As depicted, the metric creation time for the 100 virtual servers in this grouping is 210 seconds, which is the time from time t1 to time t4 in this example. Thus, the metric is 210 seconds for 100 virtual servers. The time for this metric is determined as the time interval from start time 420 for virtual server VS1, which is the anchor server, to end time 430 for virtual server VS3, which is the newest end time for the group of servers on timeline 400.

Figure 5:
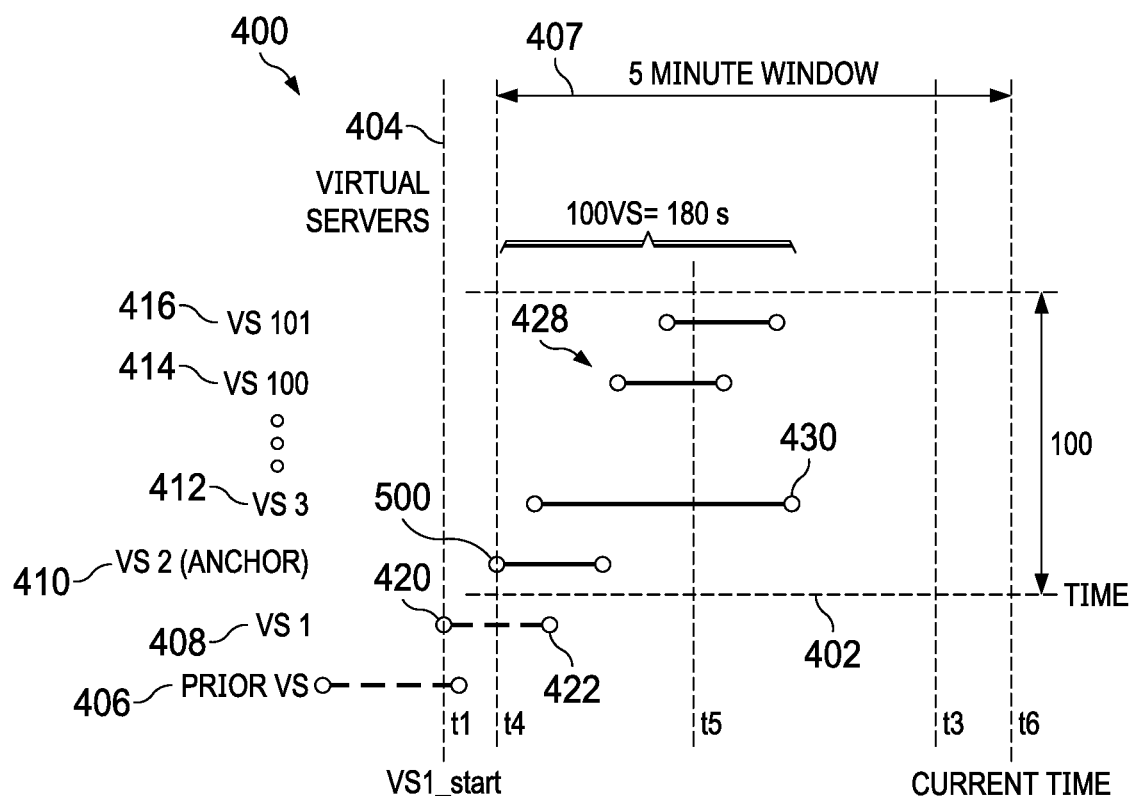
FIG. 5 is another illustration of a timeline of virtual server start and end times in accordance with an illustrative embodiment.

With reference now to FIG. 5, another illustration of a timeline of virtual server start and end times is depicted in accordance with an illustrative embodiment. In the illustrative examples, the same reference numeral may be used in more than one figure. This reuse of a reference numeral in different figures represents the same element in the different figures.

In this illustrative example, time has passed and the current time is time t6, which has changed from time t3. In this case, virtual server VS1 is no longer the anchor virtual server. Virtual server VS2 is now the anchor server based on five-minute time window 407 which is from time t4 to time t6 now that time has passed. With this change, bounding box 428 now includes virtual servers VS2-VS101 as compared to virtual servers VS1-VS100 when the current time was time t3. As a result, the group of servers has changed. In this example, virtual server VS1 was pruned or removed from the group of virtual servers and virtual server VS2 is now the virtual anchor server for the group of virtual servers. In this example, virtual server VS1 is now part of the group of virtual servers based on the total number of servers that can be present in the group and the two-minute time window for start times of virtual servers from time t4 to time t5.

In this example, the metric for the creation time is the time interval between start time 500 for virtual server VS2, which is now the current anchor server, and end time 430 for virtual server VS3. In this example, the metric is a value of 180 seconds for 100 virtual servers as compared to 210 seconds for 100 virtual servers from the prior measurement of metric for the creation time.

Figure 6:
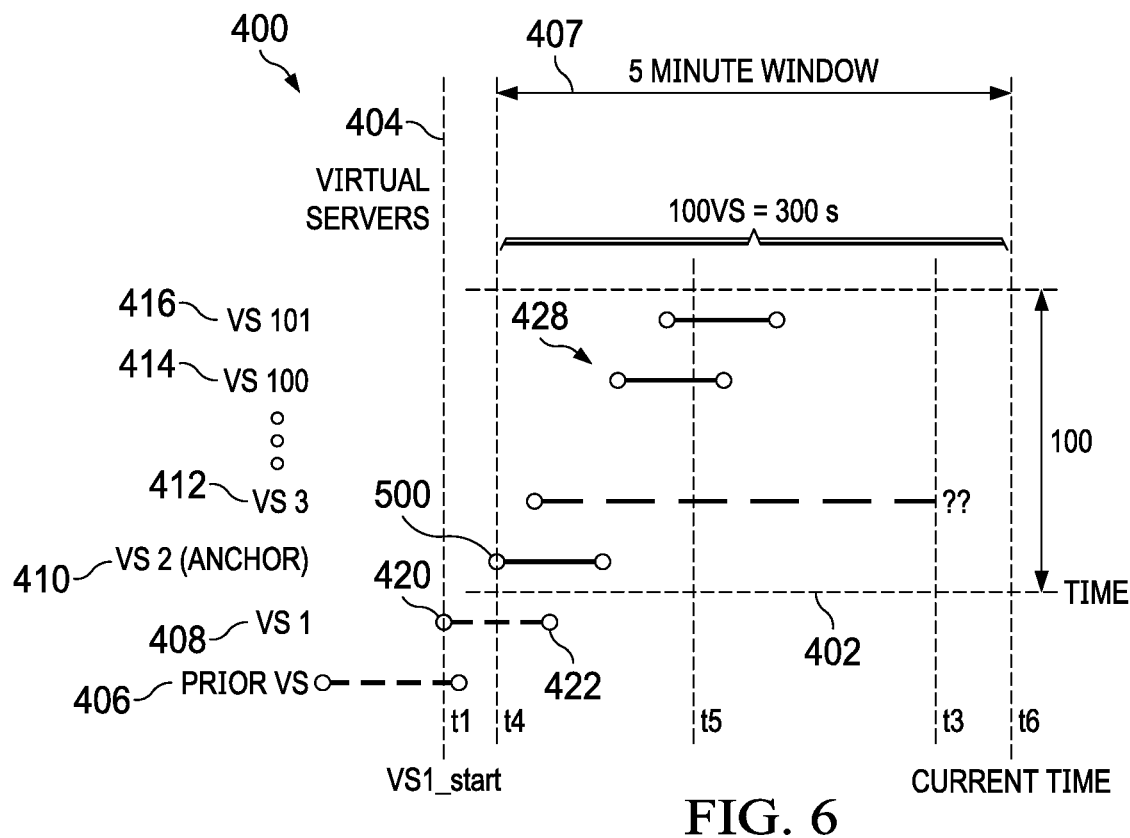
FIG. 6 is yet another illustration of a timeline of virtual server start and end times in accordance with an illustrative embodiment

In FIG. 6, yet another illustration of a timeline of virtual server start and end times is depicted in accordance with an illustrative embodiment. In this example, virtual server VS3 in timeline 400 does not have an end time as compared to the end time shown for virtual server VS3 in FIG. 5. With this alternative situation, the calculation of the metric for the creation time assumes that the current time, time t6, is the endpoint for virtual server VS3, which is the virtual server with the newest endpoint based on this assumption. With this selection of the endpoint as being the current time, the metric for the creation time is the time interval between start time 500 for virtual server VS2 and the assumed endpoint for virtual server VS3 as being the current time at time t6 for purposes of calculating the metric. In this example, the value for the metric for the creation time is 300 seconds for 100 virtual servers.

The illustrations of the timeline and calculation of metrics in FIGS. 4-6 are presented for purposes of illustrating one manner in which metric calculations can be performed for servers in a timeline. These illustrations are not meant to limit the manner in which other timelines may be organized or the manner in which calculations for metrics may be performed in other illustrative examples. In another illustrative example, a different time window can be used instead of a five-minute time window. For example, a three-minute time window, a seven-minute time window, or some other time window can be used. Additionally, a different number of virtual servers can be selected for the maximum number of servers desired. For example, the maximum number of virtual servers desired can be 75 virtual servers, 150 virtual servers, or some other number of virtual servers.

Figure 7:
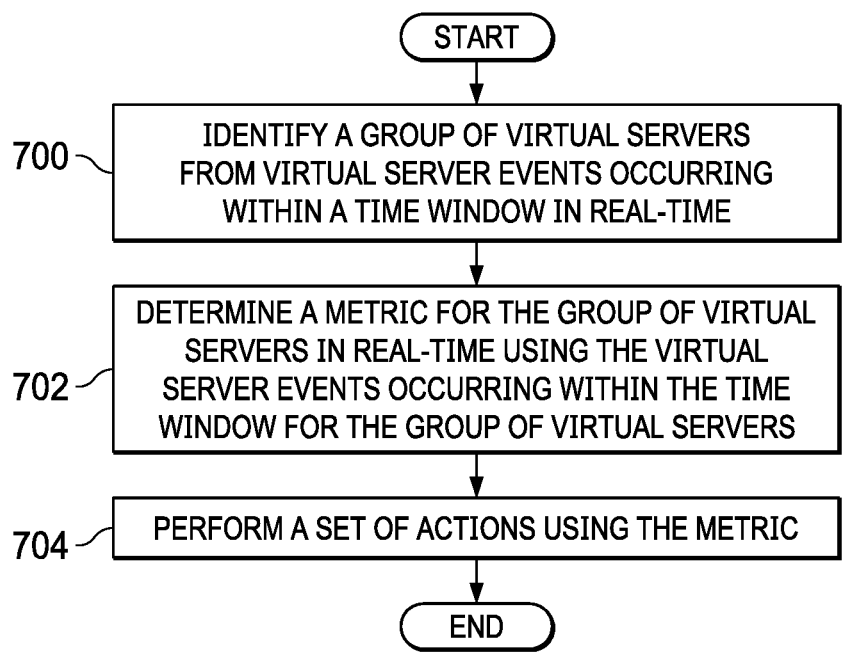
FIG. 7 is a flowchart of a process for monitoring virtual machines in accordance with an illustrative embodiment.

Turning next to FIG. 7, a flowchart of a process for monitoring virtual machines is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in virtual server monitor 304 in computer system 306 in FIG. 3.

The process begins by identifying a group of virtual servers from virtual server events occurring within a time window in real-time (step 700). The process determines a metric for the group of virtual servers in real-time using the virtual server events occurring within the time window for the group of virtual servers (step 702). In step 702, the metric is the time it takes to create one or more virtual servers in a group. The group of virtual servers is a cluster of virtual servers in a time window. In this illustrative example, the virtual server is considered to be created when the virtual server begins running.

The process performs a set of actions using the metric (step 704). The process terminates thereafter.

Figure 8:
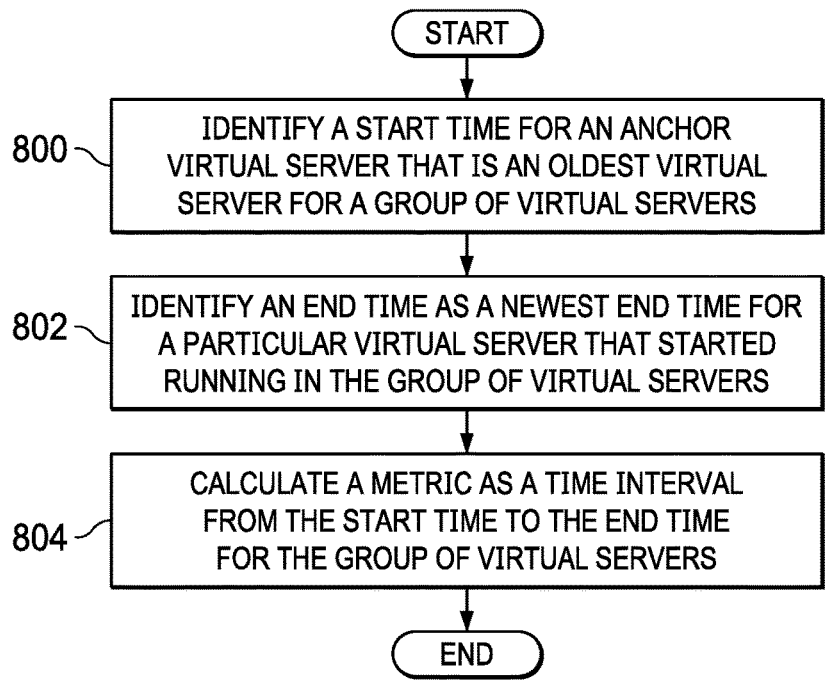
FIG. 8 is a flowchart of a process for determining a metric in accordance with an illustrative embodiment.

Turning next to FIG. 8, a flowchart of a process for determining a metric is depicted in accordance with an illustrative embodiment. The process illustrated in FIG. 8 is an example of one implementation for step 702 in FIG. 7.

The process begins by identifying a start time for an anchor virtual server that is an oldest virtual server for a group of virtual servers (step 800). In step 800, the start time is tied to a create request event. The create request event can occur at the time when a create request is received at a location such as a control plane in the cloud, a user interface for a customer, or some other location. The process identifies an end time as a newest end time for a particular virtual server that started running in the group of virtual servers (step 802). When the group of virtual servers is a single virtual server, the virtual server is the anchor virtual server and the particular virtual server with the newest end time. Additionally, if any of the virtual servers in the group of virtual servers does not have an end time, then the current time can be used for the end time for purposes of calculating the metric.

The process calculates a metric as a time interval from the start time to the end time for the group of virtual servers (step 804). The process terminates thereafter.

Figure 9:
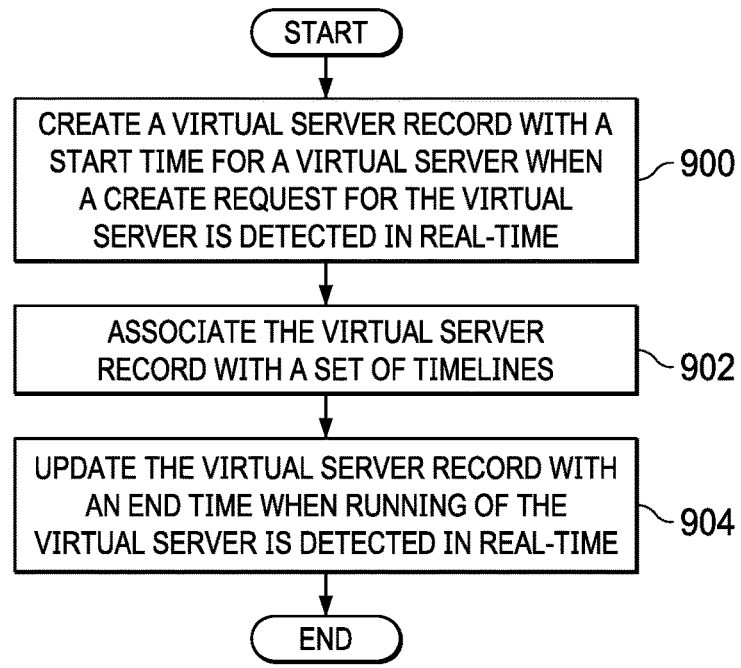
FIG. 9 is a flowchart of a process for generating records for a timeline in accordance with an illustrative embodiment.

With reference next to FIG. 9, a flowchart of a process for generating records for a timeline is depicted in accordance with an illustrative embodiment. The process in FIG. 9 can be implemented in hardware, software, or both. When implemented in software, the process can take the form of program code that is run by one or more processor units located in one or more hardware devices in one or more computer systems. For example, the process can be implemented in virtual server monitor 304 in computer system 306 in FIG. 3.

The process begins by creating a virtual server record with a start time for a virtual server when a create request for the virtual server is detected in real-time (step 900). In step 900, the start time in the virtual server record can be a start timestamp set to a time when the create request is detected. The process associates the virtual server record with a set of timelines (step 902). In this illustrative example, the set of timelines in step 902 can be for customer, a data center, or both customer and a data center.

The process updates the virtual server record with an end time when running of the virtual server is detected in real-time (step 904). In step 904, the end time can be a timestamp in the virtual server record for the time when the virtual server begins running. The process terminates thereafter.

Figure 10:
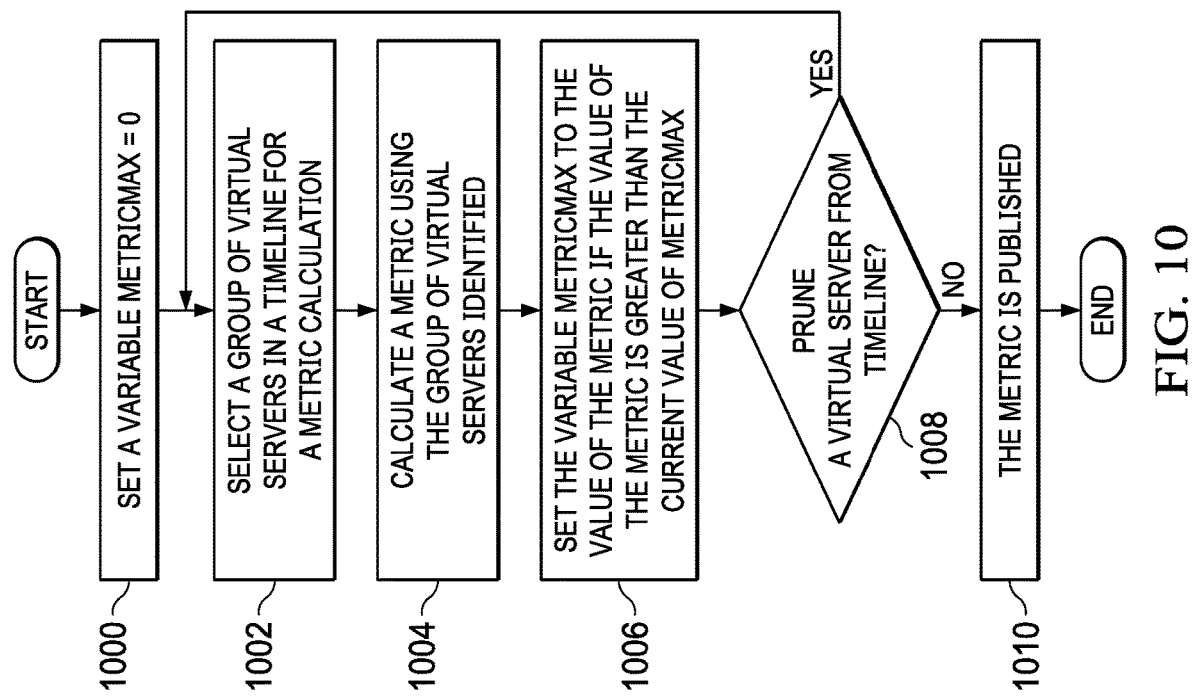
FIG. 10 is a more detailed flowchart of a process for determining a metric in accordance with an illustrative embodiment.

With reference next to FIG. 10, a more detailed flowchart of a process for determining a metric is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in virtual server monitor 304 in computer system 306 in FIG. 3.

This process can be initiated based on an event. The event can be a periodic event or a non-periodic event. For example, the process can be initiated every 10 seconds for each timeline. The process begins by setting a variable metricMax=0 (step 1000).

The process selects a group of virtual servers in a timeline for a metric calculation (step 1002). In step 1002, the group of servers can be selected in a number of different ways.

For example, the oldest virtual server that has a start time in the timeline can be selected as an anchor virtual server. The next virtual server in the timeline iterating towards the newest virtual server can be selected to be part of the group of virtual servers such that all of the virtual servers in the timeline towards the newest virtual server can be included in the group of virtual servers as long as that number of virtual servers is less than the number of servers desired and that number of servers is within a time interval from the start time of the anchor virtual server.

The process calculates a metric using the group of virtual servers identified (operation 1004). In step 1004, the metric is the time interval from the start time of the anchor virtual server to the end time of a particular server having the newest end time for all of the virtual servers in the group of virtual servers. The process sets the variable metricMax to the value of the metric if the value of the metric is greater than the current value of metricMax (step 1006).

The process then determines whether to prune a virtual server from the timeline (step 1008). In step 1008, the pruning of the virtual server from the timeline is performed because the metric for the group will not change in the future. A virtual server can be pruned or removed when the virtual server is not needed for a future metric calculation. In this illustrative example, the virtual server that is pruned is the anchor virtual server. For example, the pruning of the anchor virtual can occur when a determination is made that no incoming events can change the calculated metric (due to the time window and virtual server count filtering) for a group of virtual servers that start with the anchor virtual server.

If a virtual server is pruned, the process returns to step 1002 to select the group of servers from the timeline. Otherwise, the metric is published (step 1010). The process terminates thereafter. In other illustrative examples, other actions can be taken in addition to or in place of publishing the metric. For example, resources for the virtual servers can be reallocated in an effort to change the metric to a desired value in future calculations. As another example, an alert can be sent to a system administrator or other user.

Figure 11:
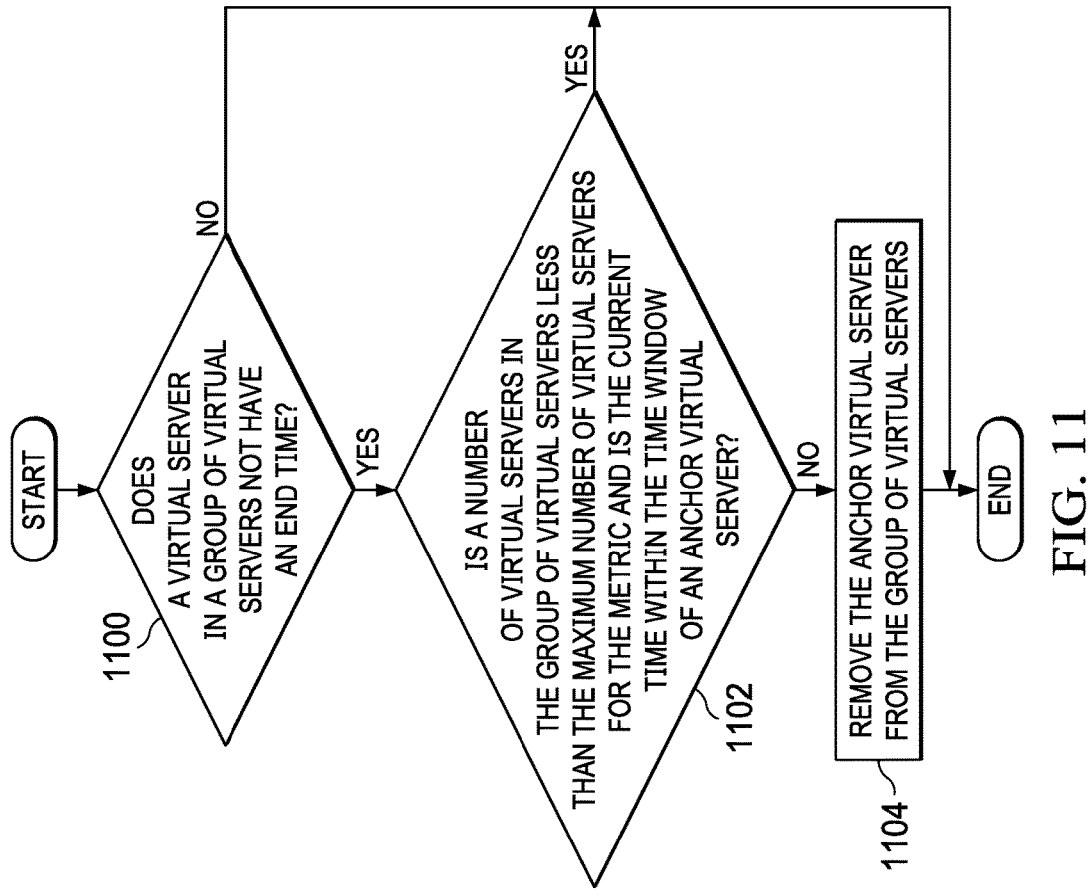
FIG. 11 is a flowchart of a process for pruning virtual servers from a group of virtual servers in accordance with an illustrative embodiment.

With reference next to FIG. 11, a flowchart of a process for pruning virtual servers from a group of virtual servers is depicted in accordance with an illustrative embodiment. The process illustrated in FIG. 11 is an example of one manner in which step 1008 in FIG. 10 can be implemented to prune virtual servers from a group of virtual servers.

The process begins by determining whether a virtual server in a group of virtual servers does not have an end time (step 1100). When a virtual server does not have an end time, that virtual server has not reached a running state and has not timed out. If a virtual server does not have an end time, the process terminates.

With reference again to step 1100, if all of the virtual servers in the group of virtual servers have end times, a determination is made as to whether the number of virtual servers in the group of virtual servers is less than the maximum number of virtual servers for the metric and if the current time is within the time window of an anchor virtual server (step 1102). If the number of virtual servers in the group of virtual servers is less than the maximum number of virtual servers for the metric and if the current time is within the time window of the anchor virtual server, the process terminates. In this example, the time window starts from the anchor virtual server's creation request event timestamp and extends into the future, such as, for example, two minutes. In the depicted example, the time window is used to filter the group of virtual server records in the timeline for the calculation of the metric. With this time window, the group of virtual servers can be virtual servers having start times within a two-minute time window that starts from the start time of the anchor virtual server.

The determination in step 1102 is used to determine whether a future virtual server can appear as part of the group of virtual servers causing a different value for metric. If that is the case, then the process terminates without removing the anchor virtual server.

Otherwise, the process removes the anchor virtual server from the group of virtual servers (step 1104), with the process terminating thereafter. In other words, if the number of virtual servers in the group of virtual servers is equal to the greatest number of virtual servers that should be considered in the time interval for the anchor virtual server, the anchor virtual server is pruned or removed from the virtual server records or timeline.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
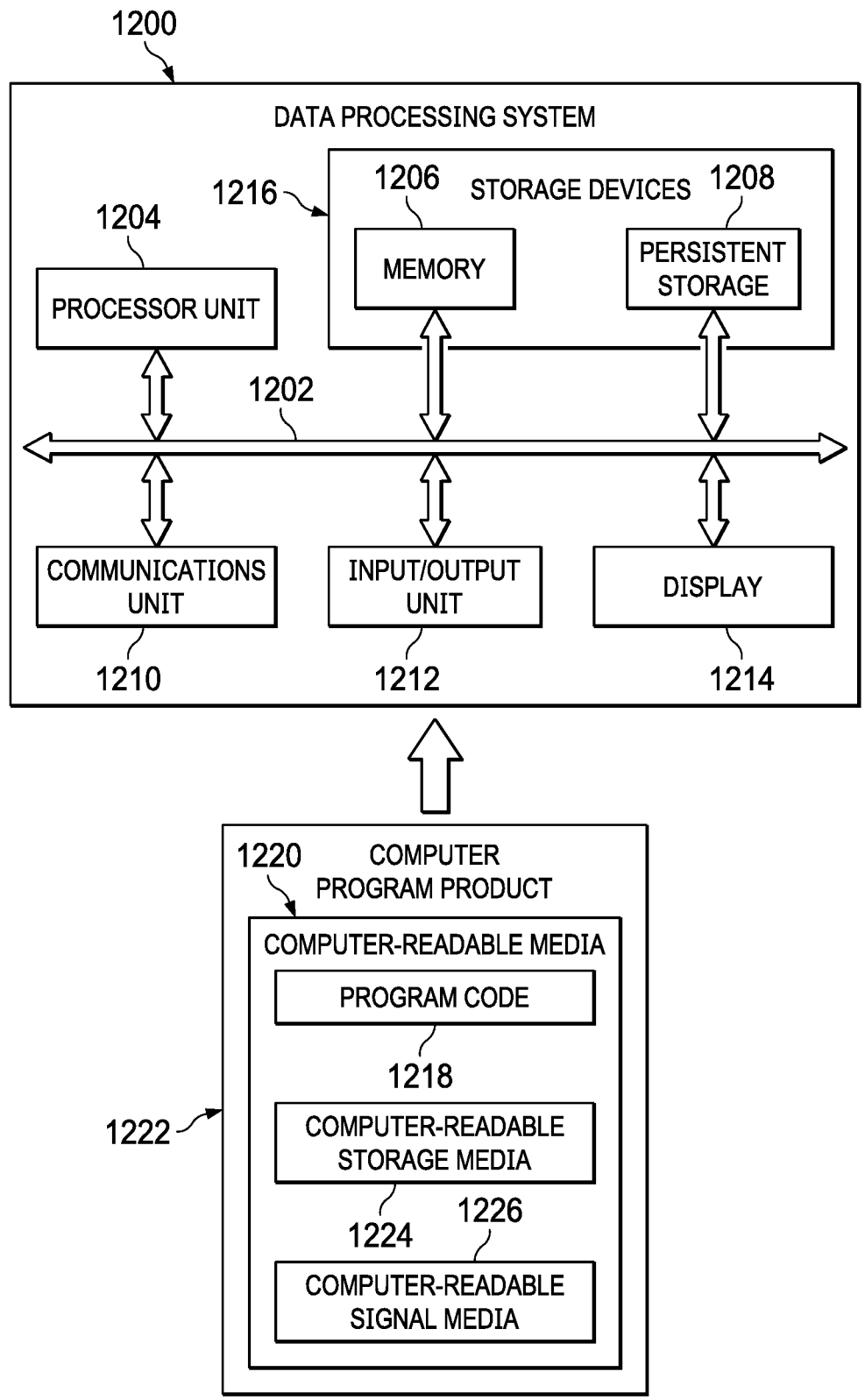
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement cloud computing nodes 10 and other computing devices in FIG. 1 and server the computers and other hardware computing devices in hardware and software layer 60 in FIG. 2. Data processing system 1200 can also be used to implement computer system 306 in FIG. 3. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

Thus, the illustrative embodiments of the present invention provide a computer-implemented method, computer system, and computer program product for monitoring virtual servers. In one illustrative example, the virtual servers are monitored in real-time. A group of virtual servers from virtual server events occurring within a time window is identified by a computer system in real-time. A metric is determined for the group of virtual servers by the computer system in real-time using the virtual server events occurring within the time window for the group of virtual servers. A set of actions is performed by the computer system using the metric.

The illustrative examples enable determining metrics for server creation using virtual server events detected in real-time. In the illustrative examples, these virtual server events include create request events and run events for virtual servers. The illustrative examples place these events and timelines on at least one of a per customer or a per data center basis. Further, the illustrative examples determine clusters of virtual server events for a selected number of servers using a sliding or moving time window. The illustrative examples enable determining a metric on a regular or periodic basis in real-time such as every 10 seconds, every 30 seconds, every two minutes, or some other period of time. Further, the metric can also be determined based on an event such as the creation of some number of virtual servers, when a user requests a current metric for server creation, or some other suitable non-periodic event. Further, the illustrative examples enable removing events with respect to servers when those events are no longer relevant for determining the metric.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for monitoring virtual servers in real-time, the method comprising:
   identifying, by a computer system, a group of virtual servers from virtual server events occurring within a time window in real-time;
   determining, by the computer system, a metric for the group of virtual servers in real-time using the virtual server events occurring within the time window for the group of virtual servers; and
   performing, by the computer system, a set of actions using the metric,
   wherein determining, by the computer system, the metric for the group of virtual servers in real-time using the virtual server events occurring within the time window for the group of virtual servers comprises:
   identifying, by the computer system, a start time for an anchor virtual server that is an oldest virtual server for the group of virtual servers, wherein the start time is when a create request for the anchor virtual server is detected in real-time;
   identifying, by the computer system, an end time as a newest end time for a particular virtual server that started running in the group of virtual servers, wherein the end time is when running of the particular virtual server is detected in real-time; and calculating, by the computer system, the metric as a time interval from the start time to the end time for the group of virtual servers; and wherein performing, by the computer system, the set of actions using the metric comprises at least:

allocating resources, thereby causing the time interval from the start time to the end time for the group of virtual servers to move towards a desired time interval.

2. The method of claim 1 further comprising:

repeating identifying, by the computer system, the group of virtual servers from the virtual server events occurring within the time window in real-time and determining, by the computer system, the metric for the group of virtual servers in real-time using the virtual server events occurring within the time window for the group of virtual servers.

3. The method of claim 1 further comprising:

pruning, by the computer system, a virtual server from the group of virtual servers when the virtual server is not needed for a future determination of the metric.

4. The method of claim 1 further comprising:

creating, by the computer system, a virtual server record with a start time for a virtual server when a create request for the virtual server is detected in real-time; and updating, by the computer system, the virtual server record with an end time when running of the virtual server is detected in real-time.

5. The method of claim 4, wherein the virtual server record is for a timeline associated with at least one of a customer and a data center, wherein the timeline comprises the start time and the end time.

6. The method of claim 1, wherein the virtual server events comprise at least one of a create request event in which a create request is received to create a virtual server and a run event in which the virtual server begins running.

7. The method of claim 1, wherein the set of actions further includes at least one of publishing the metric in a database, creating an entry in a log for a customer, creating an entry in the log for a data center, and sending an alert to a data center administrator.

8. A virtual server management system comprising:

a computer system that identifies a group of virtual servers from virtual server events occurring within a time window in real-time; determines a metric for the group of virtual servers in real-time using the virtual server events occurring within the time window for the group of virtual servers; and performs a set of actions using the metric, wherein the computer system, in determining the metric for the group of virtual servers in real-time using the virtual server events occurring within the time window for the group of virtual servers, the computer system;

identifies a start time for an anchor virtual server that is an oldest virtual server for the group of virtual servers, wherein the start time is when a create request for the anchor virtual server is detected in real-time;

identifies an end time as a newest end time for a particular virtual server that started running hat started running in the group of virtual servers, wherein the end time is when running of the particular virtual server is detected in real-time; and calculates the metric as a time interval from the start time to the end time for the group of virtual servers; and wherein the computer system, in performing the set of actions using the metric performs at least:

allocating resources, thereby causing the time interval from the start time to the end time for the group of virtual servers to move towards a desired time interval.

9. The virtual server management system of claim 8, wherein the computer system repeats identifying the group of virtual servers from the virtual server events occurring within the time window in real-time and determining the metric for the group of virtual servers in real-time using the virtual server events occurring within the time window for the group of virtual servers.

10. The virtual server management system of claim 8, wherein the computer system prunes a virtual server from the group of virtual servers when the virtual server is not needed for a future determination of the metric.

11. The virtual server management system of claim 8, wherein the computer system creates a virtual server record with a start time for a virtual server when a create request for the virtual server is detected in real-time and updates the virtual server record with an end time when running of the virtual server is detected in real-time.

12. The virtual server management system of claim 11, wherein the virtual server record is for a timeline associated with at least one of a customer and a data center, wherein the timeline comprises the start time and the end time.

13. The virtual server management system of claim 8, wherein the virtual server events comprise at least one of a create request event in which a create request is received to create a virtual server and a run event in which the virtual server begins running.

14. The virtual server management system of claim 8, wherein the set of actions further includes at least one of publishing the metric in a database, creating an entry in a log for a customer, creating an entry in the log for a data center, and sending an alert to a data center administrator.

15. A computer program product for real-time monitoring of virtual servers, the computer program product comprising:

a computer-readable storage media;

first program code, stored on the computer-readable storage media, executable by a computer system to cause the computer system to identify a group of virtual servers from virtual server events occurring within a time window in real-time;

second program code, stored on the computer-readable storage media, executable by the computer system to cause the computer system to determine a metric for the group of virtual servers in real-time using the virtual server events occurring within the time window for the group of virtual servers; and third program code, stored on the computer-readable storage media, executable by the computer system to cause the computer system to perform a set of actions using the metric, wherein the second program code comprises:

program code, stored on the computer-readable storage media, executable by the computer system to cause the computer system to identify a start time for an anchor virtual server that is an oldest virtual server for the group of virtual servers, wherein the start time is when a create request for the anchor virtual server is detected in real-time;

program code, stored on the computer-readable storage media, executable by the computer system to cause the computer system to identify an end time as a newest end time for a particular virtual server that started running in the group of virtual servers, wherein the end time is when running of the particular virtual server is detected in real-time; and program code, stored on the computer-readable storage media, executable by the computer system to cause the computer system to calculate the metric as a time interval from the start time to the end time for the group of virtual servers; and wherein the third program code, in performing the set of actions using the metric, causes the computer system to perform at least:

allocation of resources, thereby causing the time interval from the start time to the end time for the group of virtual servers to move towards a desired time interval.

16. The computer program product of claim 15 further comprising:

fourth program code, stored on the computer-readable storage media, executable by the computer system to cause the computer system to repeat initiating execution of the first program code and the second program code.

17. The computer program product of claim 15 further comprising:

fourth program code, stored on the computer-readable storage media, executable by the computer system to cause the computer system to prune a virtual server from the group of virtual servers when the virtual server is not needed for a future determination of the metric.

18. The computer program product of claim 15 further comprising:

fourth program code, stored on the computer-readable storage media, executable by the computer system to cause the computer system to create a virtual server record with a start time for a virtual server when a create request for the virtual server is detected in real-time; and fifth program code, stored on the computer-readable storage media, executable by the computer system to cause the computer system to update the virtual server record with an end time when running of the virtual server is detected in real-time.

* * * * *